United States Patent [19]

Brock et al.

[11] 3,829,896

[45] Aug. 13, 1974

[54] BIAS MEANS FOR BATCH FABRICATED MAGNETIC HEAD AND METHOD OF MANUFACTURE THEREOF

[75] Inventors: George W. Brock; Maxwell R. Cannon, both of Boulder; Frank B. Shelledy, Longmont, all of Colo.

[73] Assignee: International Business Machines Corporation, Armonk, N.Y.

[22] Filed: Nov. 8, 1972

[21] Appl. No.: 304,691

[52] U.S. Cl. .................... 360/125, 29/603, 360/66, 360/123

[51] Int. Cl. ........ G11b 5/20, G11b 5/42, G11b 5/22

[58] Field of Search ....... 179/100.2 C; 340/174.1 F; 346/74 MC; 29/603

[56] References Cited

UNITED STATES PATENTS

| | | | |
|---|---|---|---|
| 3,549,825 | 12/1970 | Trimble | 179/100.2 C |
| 3,564,558 | 2/1971 | Tolman et al. | 179/100.2 C |
| 3,611,417 | 10/1971 | Sauter et al. | 179/100.2 C |
| 3,639,699 | 2/1972 | Tiemann | 179/100.2 C |
| 3,700,827 | 10/1972 | Nagao | 179/100.2 C |
| 3,723,665 | 3/1973 | Lazzari et al. | 179/100.2 C |

*Primary Examiner*—Alfred H. Eddleman
*Attorney, Agent, or Firm*—Gunter A. Hauptman

[57] ABSTRACT

A bias current path for a plurality of thin film, batch fabricated magnetic recording heads is placed on a substrate in the same plane as the recording windings. The active portion of the bias path surrounds a recording conductor and both the path and conductor are encompassed by a plurality of head pole pieces.

19 Claims, 13 Drawing Figures

PATENTED AUG 13 1974

3,829,896

SHEET 4 OF 4

BIAS MEANS FOR BATCH FABRICATED MAGNETIC HEAD AND METHOD OF MANUFACTURE THEREOF

PRIOR ART

It has long been recognized that magnetic recording is enhanced by providing an additional bias signal simultaneously with the data recording signal. While the underlying principles are not fully explained in the literature, the practical design criteria for bias recording have, nevertheless, been refined. In one form of bias recording, an AC bias signal has been applied to conventional heads through: the same winding used for data recording, a separate winding in the same head, or a winding in an extra head adjacent the recording head. For example, Johnson et al. U.S. Pat. No. 3,467,789 issued Sept. 16, 1969, suggests a conductor, carrying a high frequency bias signal, directly in the gap of a conventional magnetic head.

Frequently, the bias signal has been superimposed on the data signal in a conventional head's recording winding. An example of this appears in Johnson U.S. Pat. No. 3,621,148 issued Nov. 16, 1971. However, this is not applicable to many conventional heads with small diameter windings and is substantially inapplicable to the thin film batch fabricated heads. The very small cross-section of a conductive layer forming the recording winding in a thin film head is normally adequate to carry only data recording current. Any current additional to that required for recording data would cause undesirable heating. This problem is avoided in conventional heads by larger windings, by separate bias windings or by a separate bias conductor passed directly through the pole gap. This latter approach, appearing for example in Johnson et al. U.S. Pat. No. 3,467,789, applies the bias field directly to the recording medium.

Conventional heads cannot economically achieve the high data densities required by current magnetic tape and disc systems and achievable by recent advances in magnetic media. As a result, thin film technology has been applied to magnetic head manufacture in an attempt to build efficient high density magnetic heads. An extra advantage of this type of manufacture is that many heads can be simultaneously manufactured in batches with relatively few individual manual operations. Reis U.S. Pat. No. 2,866,013 issued Dec. 23, 1958, describes an early thin film recording head using the Hall effect. There, a single head element for a single track comprises a Hall device driven by a data layer and excited by a single layer carrying a high frequency current. The single layer overlays the Hall device and data layer and must be insulated therefrom by a process which is even today difficult and unreliable. A similar Hall device with a plurality of tracks appears in Tsukagoshi U.S. Pat. No. 3,643,035 issued Feb. 15, 1972. The Hall effect does not make use of the principle of magnetic induction and is not capable of generating the strong fields required for practical recording.

The problem of a thin film magnetic recording head has not been fully addressed in the relevant prior art, for example, Trimble U.S. Pat. No. 3,549,825 issued Dec. 22, 1967. An article by P. F. J. Landler at pages 1792–1793 of the May, 1969, issue of the IBM TECHNICAL DISCLOSURE BULLETIN discloses a single element thin film head having an extra conductor, part of which is removed during manufacture, but does not discuss biasing.

THE INVENTION

Recording bias is provided by extending a conductor, of the type in Landler, through the gaps of a plurality of inductive thin film heads in the same plane as the recording conductors and within the recording fields created by the head poles. In one embodiment, a plurality of single turn magnetic recording windings deposited on a substrate are encompassed by a single bias element deposited adjacent the elements. Each winding, and a portion of the adjacent bias element, is surrounded by a horseshoe-shaped magnetic pole deposition. In a second embodiment, the single turn winding is replaced by a multi-turn spiral winding. Both biased recording heads are made by a process including the steps of depositing on a ferrite substrate: a wear and insulating ceramic, a conductor, a closure of ferrite; followed by additional subtractive steps.

IN THE DRAWINGS

Figure 1:
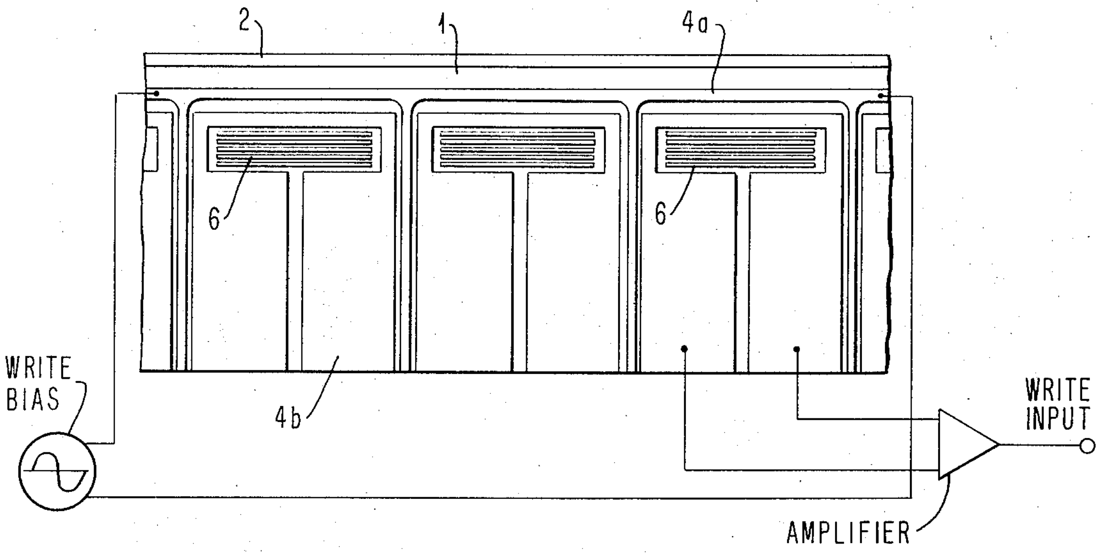
FIG. 1 is a plan view of a single-turn inductive magnetic write head embodying the invention.

Referring first to FIG. 1, the invention will be described first with reference to an illustrative single-turn head intended for recording tracks of information on magnetic media such as discs, tapes, drums, cards, stripes, etc. The head includes a substrate 1 which may be a ferrite block, a thin film of ferrite, nickel-iron, Permalloy, or the like formed on a thicker base, etc. On this substrate 1, may be placed a strip 2 comprising $Al_2O_3$ or other material having good wear resisting characteristics. An electrically conductive material such as copper, silver, or aluminum is placed on the substrate 1 as horseshoe-shaped loops **4*b*. Each loop provides a separate current path for generating a single magnetic write field for recording information on one track of a medium. Another conductive strip 4*a* of material similar to the material forming loops 4*b* entirely encompasses the elements 4*b*. The strip 4*a* and the loops 4*b* are adjacent in either the same plane, as shown, or in two overlayed planes. When a write current is applied to the elements 4*b* from a write amplifier, a high frequency write bias current on the order of two to seven times the write current (recording) frequency is applied to the element 4*a*** from a write bias source. Typically, for write currents of 200–800 ma, the bias current may be 400–800 ma. A head has been investigated under the following conditions:

write current — 300 ma
bias current — 400 ma
recording density — $20 \times 10^3$ flux reversals per inch
bias frequency — $7 \times 10^6$ Hz recording frequency — $1.2 \times 10^6$ Hz The write bias current may be applied either across all heads simultaneously, as shown, or through those portions of conductors 4*a* surrounding one or more separate elements. As will be explained, a complete magnetic head requires a magnetic circuit, enclosing the conductors 4*a* and 4*b*, for each write track. This magnetic circuit includes substrate 1, pole closures 6, and a capping magnetic material (not shown in FIG. 1), which may be made of the same or different magnetic material.

Figure 2:
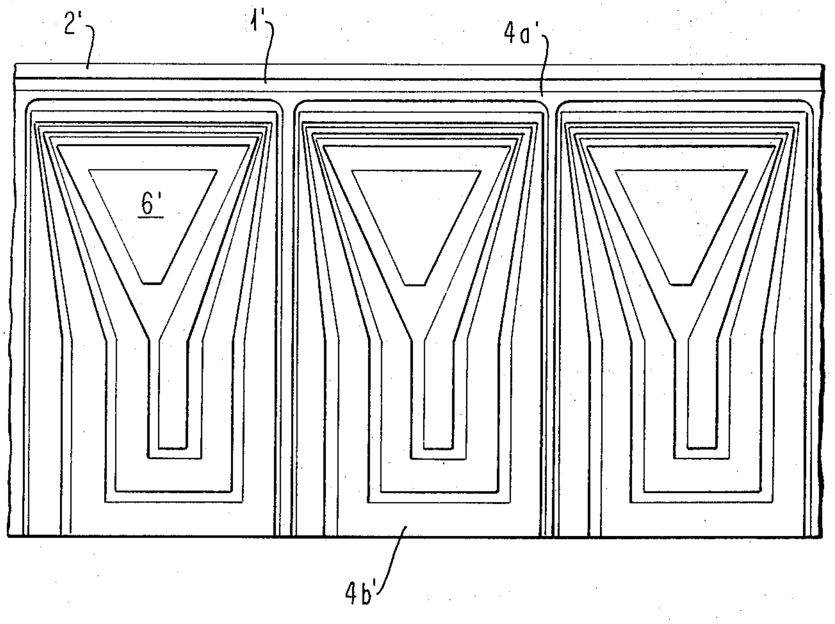
FIG. 2 is a plan view of a multi-turn magnetic write head embodying the invention.

FIG. 2 illustrates a modification of the head of FIG. 1 wherein a spiral winding replaces the single-turn winding of FIG. 1. The numerals of FIG. 2 are numbered according to the corresponding elements in FIG. 1. Thus, a substrate 1' carries a wear resisting strip 2' and conductors 4*b'* and 4*a'*. The winding conductors 4*b'* are shown in a spiral configuration to illustrate one way of obtaining a greater inductive field than may be obtained with the single-turn conductor 4*b* of FIG. 1. The bias conductor 4*a'* is driven, and may be positioned adjacent the windings 4*b'*, in the same manner as the bias conductor 4*a* of FIG. 1.

Figure 3:
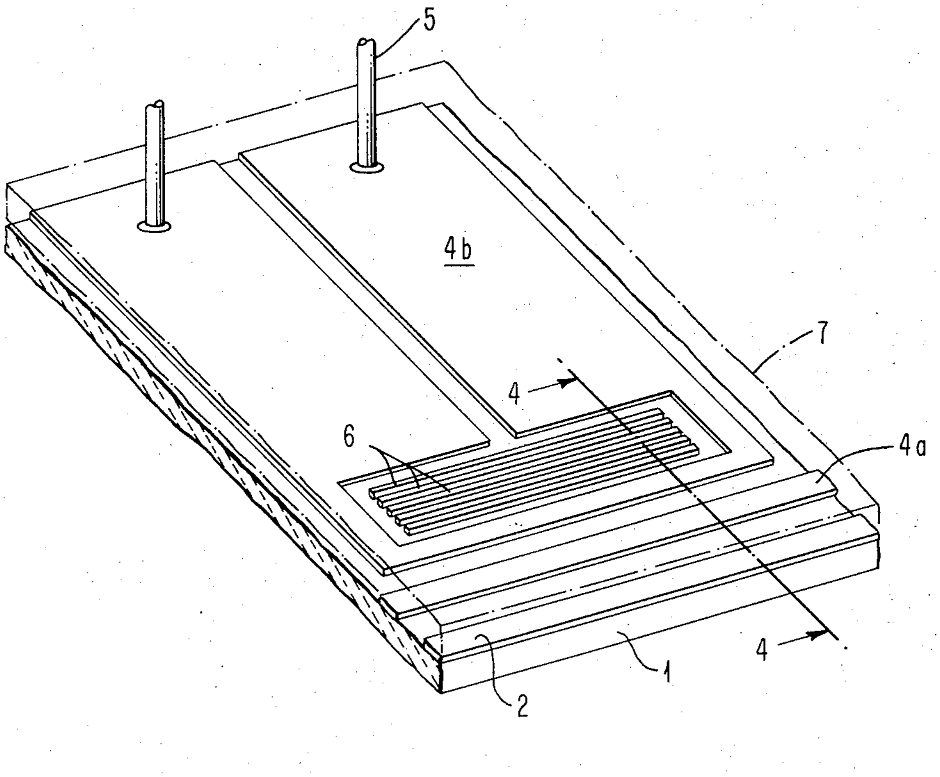
FIG. 3 is a three dimensional view of the single-turn head shown in FIG. 1.

Referring now to FIG. 3, the formation of a magnetic circuit necessary for the operation of the magnetic head of FIG. 1 will be explained. In the case of a substrate 1 made of a single piece of magnetic material (for example, ferrite), a complete pole is formed, after placing conductors 4*a* and 4*b* on the substrate 1, by placing strips of magnetic material 6 (for example, nickel-iron) on the substrate 1 and then covering the entire head with another magnetic material 7 (for example, ferrite). If suitable insulating layers are provided between the magnetic material and any adjacent conductors, such as 4*a* and 4*b*, the substrate 1, the strips 6, and the covering portion 7 may all be nickel-iron. The magnetic circuit is formed by those portions of the pole pieces which completely surround the top portion of the conductive element 4*b* by means of a pole closure formed by the strips 6. The widths of gaps used for writing are defined by the width of the conductors 4*a* and 4*b*. This is further illustrated in FIG. 4, where a cross-section of the head shown in FIG. 3 appears. The ferrite pieces 1 and 7 sandwich the layers of copper 4*a* and 4*b* as well as the closures 6. Due to the difficulty of depositing some conductors such as copper directly on substrates such as ferrites, another material intervenes between the layers 4*a* and 4*b* and the layer 1. This material may be any material, such as titanium, capable of forming an adequate bond between the two materials. The bond is not essential in the case of the covering material 7 because a pressure may be applied to hold the material 7 in place.

Figure 4:
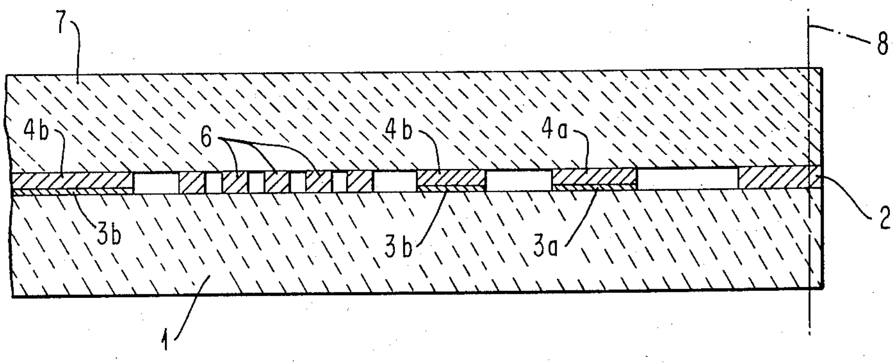
FIG. 4 shows a cross-section of the head of FIG. 3.
Figure 5:
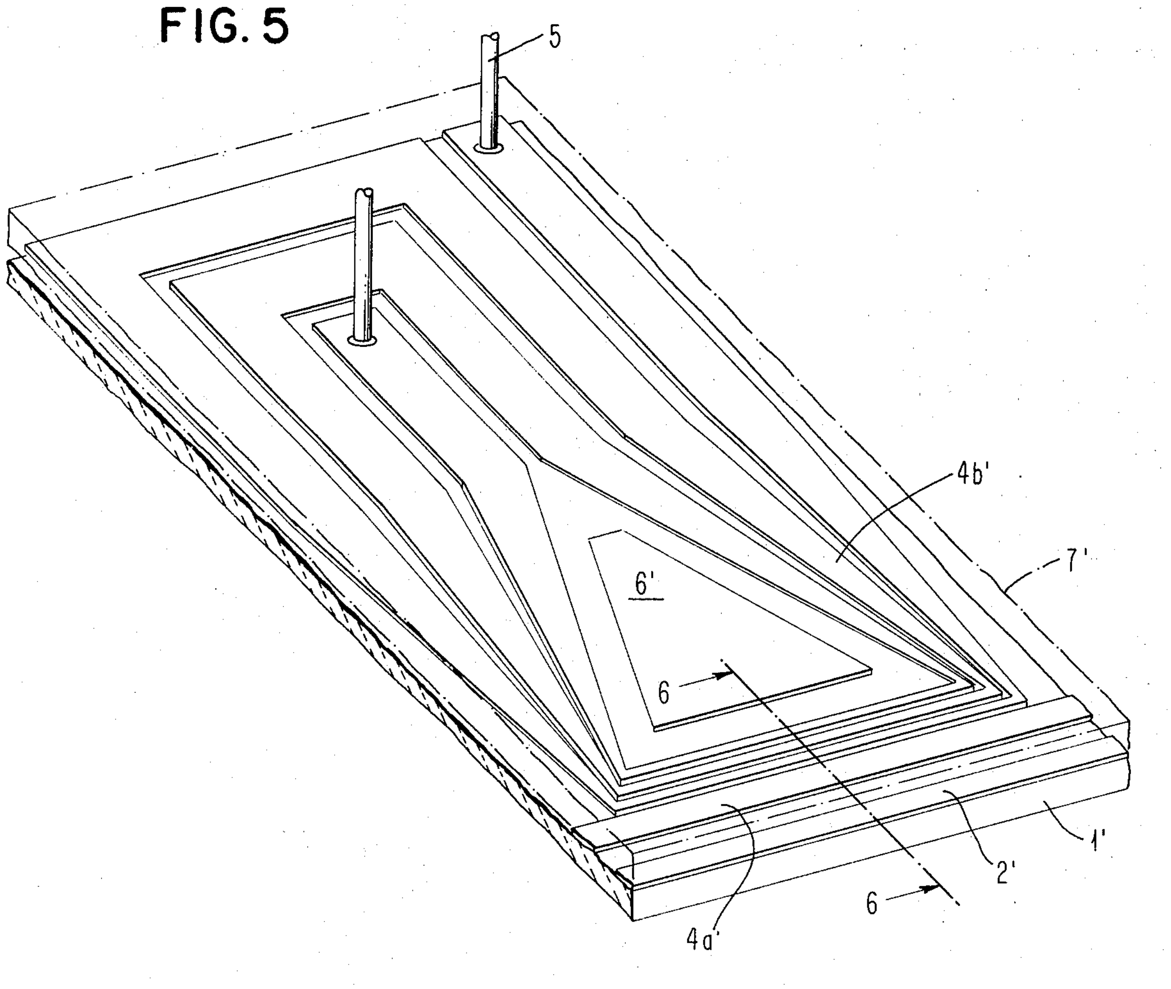
FIG. 5 is a three dimensional view of the multi-turn head of FIG. 2.
Figure 6:
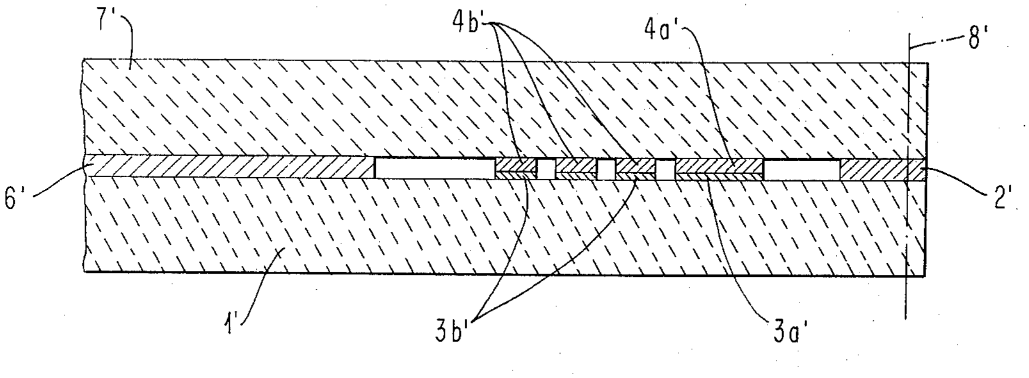
FIG. 6 shows a cross-section of the head of FIG. 5.

Referring now to FIGS. 5 and 6, a multi-turn version of the head previously explained with reference to FIGS. 3 and 4 is shown. The method of construction is similar. In the case of the multi-turn head, the pole closure 6' may be formed from a trapezoidal-shaped magnetic material.

Electrical contact to the single-turn winding is made through external conductors 5 as shown in FIG. 3. The final head dimensions, such as head throat height, are determined by grinding the head surface to line 8, as shown in FIG. 4. Similarly, with reference to FIGS. 5 and 6, electrical contact to the spiral winding is made with conductors 5' and the proper head throat height and finish are obtained by grinding and lapping to line 8'.

Figure 7A:
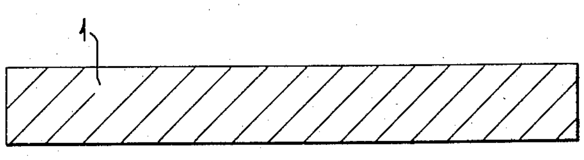
FIGS. 7A–7G illustrate a method of manufacturing the head of FIG. 1.
Figure 7B:
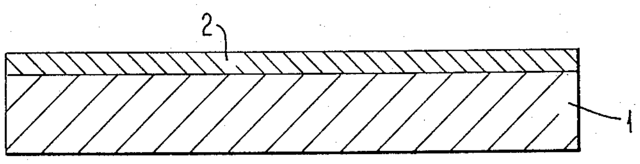
Figure 7C:
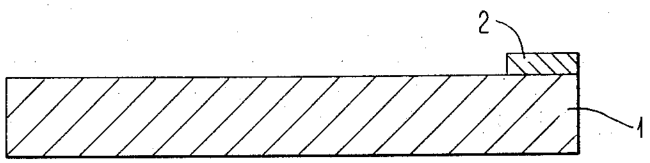
Figure 7D:
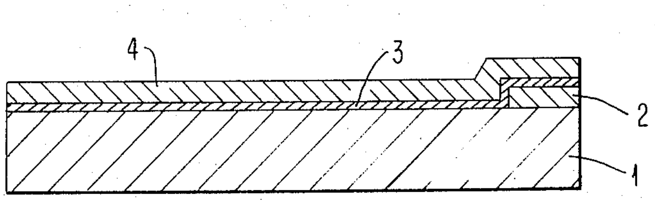
Figure 7E:
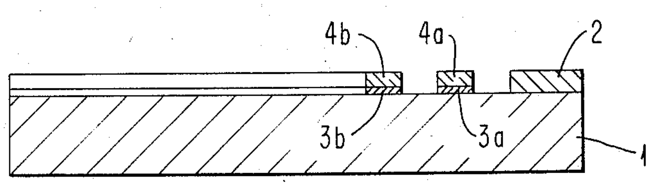
Figure 7F:
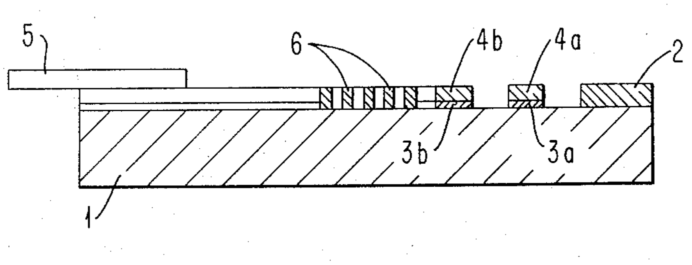
Figure 7G:
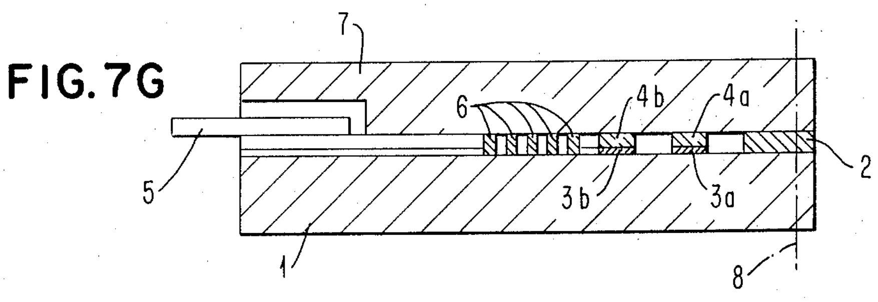

FIGS. 7A–7G illustrate a method of making one version of the head shown in FIGS. 1, 3, and 4. It will be assumed that the head is constructed using ferrite blocks 1 and 7 and a conductive material made of copper. In the first step shown in FIG. 7A, a ferrite block 1 is smoothed to a flat upper surface upon which is deposited $Al_2O_3$ layer 2 as shown in FIG. 7B. In a third step, shown in FIG. 7C, a portion of the $Al_2O_3$ layer is removed by chemical, electrical, or mechanical means to leave a wear strip 2. In FIG. 7D, the next step involves deposition of a layer 3 of titanium followed by deposition of a layer 4 of copper. In step 5, shown in FIG. 7E, the deposited layers are appropriately removed, by etching, for example, to leave strips formed of copper 4*a* on titanium 3*a* and 4*b* on 3*b*. In FIG. 7F, the next step includes deposition of nickel-iron strips 6 and the placement of a copper lead 5 on each side of the conductive loop 4*b*. Finally, in step 7 shown in FIG. 7G, the head is completed by placing the top ferrite block on the completed element and grinding and lapping along line 8.

While the invention has been particularly shown and described with reference to preferred embodiments thereof, it will be understood by those skilled in the art that various changes in form and details may be made therein without departing from the spirit and scope of the invention.

What is claimed is:

1. A thin film, batch fabricated inductive magnetic recording head, comprising:

a first generally planar magnetic layer;

a set of separate first elongated conductive layers each deposited in a row on said first magnetic layer and each forming an inductive path;

a second elongated conductive layer deposited on said first magnetic layer adjacent, and in the same plane as, said set of separate first conductive layers;

a set of separate second generally planar magnetic layers, one for each separate first conductive layer, deposited substantially over all said first and second conductive layers; and a third magnetic layer intermediate said first and second magnetic layer and passing through each of said first conductive layers to complete a magnetic path from said first to said second magnetic layers.

2. The head of claim 1 wherein each of the first conductive layers comprises a single-turn bend.

3. The head of claim 1 wherein each of the first conductive layers comprises a multi-turn spiral.

4. A multi-track, multi-gap magnetic recording head including in combination:

a substantially flat magnetic substrate;

a plurality of elongated thin film recording conductors, one for each track, deposited on said substrate in a row along a first line;

a single elongated thin film bias conductor deposited on said substrate adjacent said recording conductors along a second line adjacent said first line; and a magnetic closure overlying said recording and bias conductors and magnetically connected to the substrate around said recording conductors to form a magnetic path including the substrate and the closure, and forming a series of gaps, defined by said bias conductors, along a third line adjacent the first line and not the second line.

5. The combination of claim 4 wherein the conductors comprise a plurality of separate layers of conductive material.

6. Apparatus for orienting magnetic particles on a media in accordance with electric recording signals, including in combination:

a first magnetic material, forming a continuous layer;

a plurality of adjacent thin film electric recording conductor loops, each with an aperture, deposited on said first magnetic material in a row;

a thin film electric bias conductor deposited on said first magnetic material and encompassing all said recording conductors;

a second magnetic material placed over said recording and bias conductors and including a back-gap portion completing a magnetic path to said first layer through each said apertures;

a source of electric recording current separately connected to each recording conductor loop for supplying electric recording signals therethrough; and a source of electric bias current connected to the bias conductor for supplying bias signals therethrough.

7. The combination of claim 6 wherein the bias conductor comprises a plurality of metallic layers.

8. The combination of claim 7 wherein each recording conductor loop defines a single-turn bend.

9. The combination of claim 7 wherein each recording conductor loop defines a multi-turn spiral.

10. A magnetic recording transducer, including:

a magnetic material forming a planar substrate for receiving other materials thereon and comprising one portion of a magnetic path;

electrically conductive thin film materials deposited on said substrate in predetermined areas defining a plurality of elongated recording windings each having a central aperture and arranged in a row, and an elongated single bias winding around the periphery of said recording windings; and additional magnetic material deposited on said substrate in aforesaid areas and over said conductive material, to complete a magnetic path around each recording winding and form a non-magnetic gap defined by the bias winding.

11. The transducer of claim 10 wherein there is additionally deposited on said substrate adjacent the bias winding a non-conductive, non-magnetic wear material.

12. The transducer of claim 10 wherein the wear material is a ceramic belonging to the class of materials including $Al_2O_3$, and the conductive materials belonging to the class including copper and titanium.

13. The transducer of claim 11 wherein the conductive materials include a plurality of separately deposited metals.

14. The transducer of claim 13 wherein the recording winding is shaped as a single-turn bend.

15. The transducer of claim 13 wherein the recording winding is shaped as a multi-turn spiral.

16. The method of making a biased magnetic recording transducer comprising the steps of:

smoothing the surface of a magnetic substrate;

depositing conductive material over the entire surface;

removing selected areas of conductive material to define a plurality of aligned conductive record loops and a single conductive bias loop substantially encompassing the record loops;

further depositing magnetic material interior to the record loops; and applying additional magnetic material over each record loop and portions of the bias loop to form a magnetic path including the deposited magnetic material and a gap formed by a portion of the bias loop.

17. The method of claim 16 wherein a metallic material is deposited over the entire surface prior to depositing the conductive material, and subsequent material removal acts on both the metallic and conductive materials.

18. The method of claim 17, wherein:

a wear resisting material is deposited on the surface; and the wear resistant material is removed except from a selected area in the gap prior to further depositing magnetic material.

19. The method of claim 18 including the further step of attaching conductive leads to the record and bias loops prior to further depositing magnetic material.

* * * * *